United States Patent
Shih

(10) Patent No.: US 6,512,729 B2
(45) Date of Patent: Jan. 28, 2003

(54) OPTICAL DISK DRIVE PROTECTION DEVICE

(75) Inventor: Chean-Pin Shih, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 143 days.

(21) Appl. No.: 09/784,108

(22) Filed: Feb. 16, 2001

(65) Prior Publication Data

US 2002/0122372 A1 Sep. 5, 2002

(51) Int. Cl.[7] ............................................. G11B 33/02
(52) U.S. Cl. ........................................................ 369/75.2
(58) Field of Search ............................. 369/75.1–75.2, 369/77.1–77.2

(56) References Cited

U.S. PATENT DOCUMENTS 6,266,312 B1 * 7/2001 Akiba ........................ 369/75.1
6,445,663 B1 * 9/2002 Chen et al. ................. 369/75.1

* cited by examiner

*Primary Examiner*—Allen Cao
(74) *Attorney, Agent, or Firm*—Rosenberg, Klein & Lee

(57) ABSTRACT

An optical disk drive protection device having a metallic housing to prevent any broken debris from damaging the panel of the disk drive, the housing having a top wall face and two lateral wall faces forming into a hollow rectangular body having a front opening, a fastening slot being formed on the top wall face and the two lateral wall surfaces, close to the position of the opening, for the fastening of the panel at the opening, the panel being provided with a tray recess to retractably hold the optical disk drive tray, the panel being provided with press key recess and indicator recess for use with the operation of the disk drive, the four side edges of the panel being provided with protruded elastic buttons to fasten the panel onto the housing, characterized in that a blocking face is extended from the top wall face and is formed into a 90 degree bend with the top wall face, the bottom edge of the blocking face is aligned with the tray recess such that when the panel is positioned at the opening position of the housing, the blocking face is positioned at the inner edge face of the panel of the tray recess such that the blocking face is blocked at the panel inner edge.

1 Claim, 2 Drawing Sheets

OPTICAL DISK DRIVE PROTECTION DEVICE

BACKGROUND OF THE INVENTION (a) Field of the Invention

The present invention relates to an optical drive protection device, and in particular, a metallic housing having a front blocking face mounted within the interior of the optical drive housing. The assembled of the panel of the optical drive allows the metallic housing to block at the inner edge of the panel to prevent any breaking debris to damage the panel.

(b) Description of the Prior Art

Optical disk drive is an essential component to a computer system for CD-ROM and DVD, CD-R, CD-RW in order to provide pictures, sound, and video information.

The fast development of IT has upgraded the manufacturing of high speed driving motor, and therefore, high speed optical disk drive has now become a peripheral to home/personal computer. However, there are drawbacks with this high speed optical drives. As a result of high speed rotation of the drivers, the inferior quality of optical disk may be broken into debris which will damage the panel of the optical disk drive. In some cases, the broken debris may force out through the gap between the panels and damage the computer.

Accordingly, it is a main object of the present invention to provide an optical disk drive protection device which can block the debris of the inferior quality optical disk from damaging the panel of the optical disk drive.

SUMMARY OF THE INVENTION

Accordingly, it is an object of the present invention to provide an optical drive protection device, wherein a metallic housing having a front blocking face mounted within the interior of the optical drive housing. The assembled of the panel of the optical drive allows the metallic housing to block at the inner edge of the panel to prevent any breaking debris to damage the panel.

Yet another object of the present invention is to provide an optical drive protection device, having a metallic housing to prevent any broken debris from damaging the panel of the disk drive, the housing having a top wall face and two lateral wall faces forming into a hollow rectangular body having a front opening, a fastening slot being formed on the top wall face and the two lateral wall surfaces, close to the position of the opening, for the fastening of the panel at the opening, the panel being provided with a tray recess to retractably hold the optical disk drive tray, the panel being provided with press key recess and indicator recess for use with the operation of the disk drive, the four side edges of the panel being provided with protruded elastic buttons to fasten the panel onto the housing, characterized in that a blocking face is extended from the top wall face and is formed into a 90 degree bend with the top wall face, the bottom edge of the blocking face is aligned with the tray recess such that when the panel is positioned at the opening position of the housing, the blocking face is positioned at the inner edge face of the panel of the tray recess such that the blocking face is blocked at the panel inner edge.

A further object of the present invention is to provide an optical disk drive protection device, wherein a blocking board is formed at the opening position of the housing without changing the structure of the tray of the optical disk drive in order to achieve the protection of the interior of the disk drive.

Other objects, and advantages of the present invention can be more fully understood by reading the following detailed description of the preferred embodiment, with reference to the accompanying.

DETAILED DESCRIPTION OF THE PRESENT INVENTION

Figure 1:
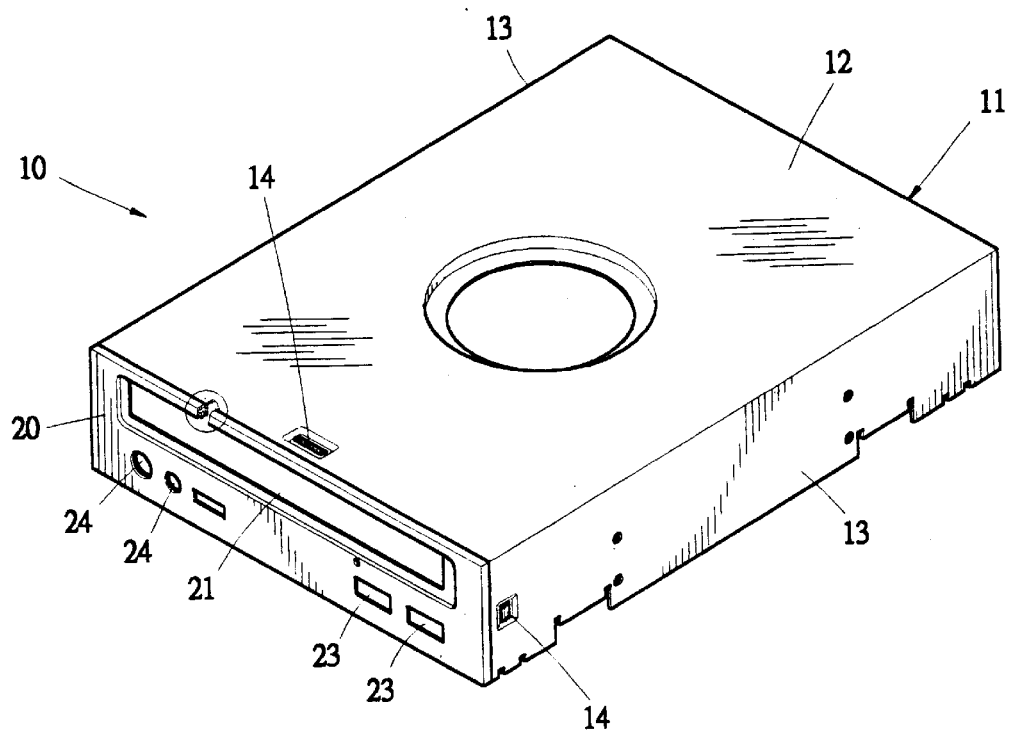
FIG. 1 is a perspective view of an optical drive housing of the present invention, wherein the housing body and the panel contact face have been exposed for illustration.
Figure 2:
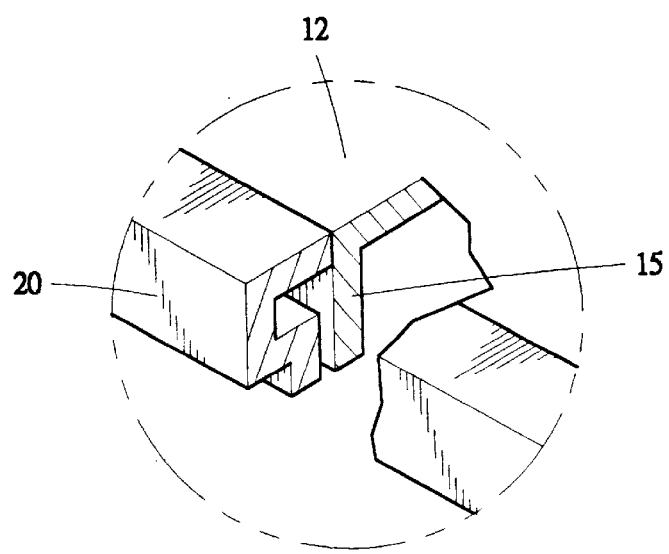
FIG. 2 is a sectional view of the housing body and the panel contact face of FIG. 1 of the present invention.

Referring to FIGS. 1 and 2, there is shown an optical disk drive protection device, which is mounted onto the optical disk drive housing 10 comprising a housing 11 and a panel 10. In accordance with the present invention, the protection device is used to protect the broken debris of the interior of the optical disk drive to damage the panel.

The housing 11 is made from metal board and has a top wall face 12 and two lateral wall faces 13 forming a hollow rectangular body with an opening at the front thereof. At position close to the opening, fastening slot 14 is provided for the fastening with the elastic button 25 provided on the panel 20. Thus, the panel 20 is fastened to the front opening of the housing 11 and is formed into an optical disk drive housing 10.

Figure 3:
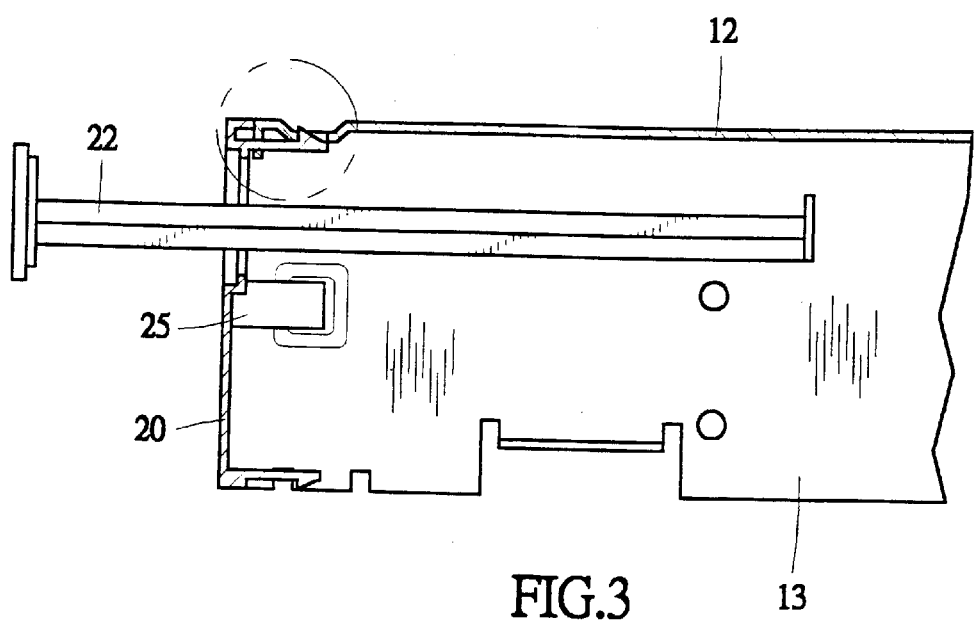
FIG. 3 is a lateral sectional view of the optical drive housing of the present invention.

In accordance with the present invention, the panel 20 is provided with a tray recess 21 to position an optical disk tray 22 to retract and extend therein, which is shown in FIG. 3. On the panel 20, a press key recess 23 and an indicator recess 24 are provided so as to operate the optical disk drive. Around the four side edges of the panel 20, there are elastic buttons 25.

The housing 11 also includes the contact portion between the front opening end and the panel 20. A blocking face 15 is extended out from the top wall face 12 and forms a 90 degree bending with the top wall face 12, and the bottom edge of the blocking face 15 is in alignment with the top edge of the tray recess 21. Thus, the retraction action of the tray 22 will not be affected.

Figure 4:
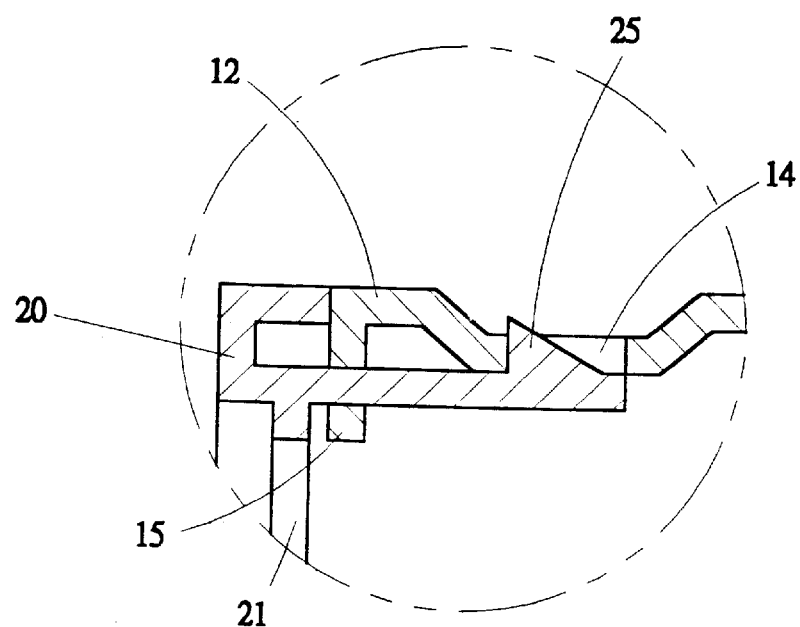
FIG. 4 is an enlarged sectional view of the blocking face of the housing of FIG. 3 of the present invention.

When the panel 20 is to be fastened to the front opening end of the housing 11, the elastic button 25 of the panel 20 is fastened into the fastening slot 14 of the housing 11. That is, the panel 20 is positioned onto the opening end of the housing 11. At this instance, the blocking face 15 is at the inner edge face of the panel 21 on top of the tray recess 21, which is shown in FIGS. 3 and 4, and the blocking face 15 is blocked at the inner edge of the panel 20, and accordingly, a protection device against the broken debris of the optical disk drive is obtained.

In accordance with the present invention, at high speed rotation of the optical disc, debris of the optical disk will be blocked by the blocking board 15 and will not directly contact with the contact panel 20. Thus, the panel 20 will not be damaged and the host computer is thus protected.

Although the preferred embodiment of the invention is described hereinabove, it should be clear that any number of alterations could be made thereto without departing from the scope of the invention is claimed.

What is claimed is:

1. An optical disk drive protection device having a metallic housing to prevent any broken debris from damaging the panel of the disk drive, the housing having a top wall face and two lateral wall faces forming into a hollow rectangular body having a front opening, a fastening slot being formed on the top wall face and the two lateral wall surfaces, close to the position of the opening, for the fastening of the panel at the opening, the panel being provided with a tray recess to retractably hold the optical disk drive tray, the panel being provided with press key recess and indicator recess for use with the operation of the disk drive, the four side edges of the panel being provided with protruded elastic buttons to fasten the panel onto the housing, characterized in that a blocking face is extended from the top wall face and is formed into a 90 degree bend with the top wall face, the bottom edge of the blocking face is aligned with the tray recess such that when the panel is positioned at the opening position of the housing, the blocking face is positioned at the inner edge face of the panel of the tray recess such that the blocking face is blocked at the panel inner edge.

* * * * *